United States Patent
Rastegar (10) Patent No.: US 11,194,010 B2
(45) Date of Patent: Dec. 7, 2021

(54) NON-GPS LOCAL FULL POSITION AND ORIENTATION REFERENCING SYSTEM

(71) Applicant: Omnitek Partners LLC, Ronkonkoma, NY (US)

(72) Inventor: Jahangir S Rastegar, Stony Brook, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 162 days.

(21) Appl. No.: 16/403,565

(22) Filed: May 5, 2019

(65) Prior Publication Data

US 2019/0339350 A1    Nov. 7, 2019

Related U.S. Application Data

(60) Provisional application No. 62/668,186, filed on May 7, 2018.

(51) Int. Cl.
*G01S 5/02* (2010.01)
*G01S 5/08* (2006.01)

(52) U.S. Cl.
CPC .......... *G01S 5/0247* (2013.01); *G01S 5/0215* (2013.01); *G01S 5/0226* (2013.01); *G01S 5/08* (2013.01)

(58) Field of Classification Search
CPC .... G01S 5/0247; G01S 5/0215; G01S 5/0226; G01S 5/08

USPC ................. 342/361, 372, 375, 365
See application file for complete search history.

(56) References Cited

U.S. PATENT DOCUMENTS

| | | | | |
|---|---|---|---|---|
| 2003/0090804 A1* | 5/2003 | Kotchick | ............ | G02F 1/13362 359/619 |
| 2006/0146284 A1* | 7/2006 | Collins | ................ | A61B 3/1208 351/215 |
| 2012/0069427 A1* | 3/2012 | Kaplan | .................... | G02F 1/116 359/308 |
| 2012/0212375 A1* | 8/2012 | Depree, IV | ........ | H01Q 15/0086 343/700 MS |
| 2018/0102215 A1* | 4/2018 | Bindseil | .................. | H01F 41/04 |

* cited by examiner

*Primary Examiner* — Bo Fan (57) ABSTRACT

A method for setting up a reference coordinate system including: providing an object with sensors having a geometrical cavity with a pick up terminal configured to provide an output that varies with orientation of the sensors with respect to a direction of an incoming polarized RF plane of polarization; using polarized RF reference sources each having two polarization planes offset from each other and different from polarization fields of other references sources; amplitude modulating the two polarization planes for each of the reference sources to define a time varying linear polarization vector for each of the reference sources; and determining, for each of the reference sources, the position and orientation of the object relative to the reference coordinate system based on a measured amplitude of the time varying linear polarization vector at the sensors, a predetermined mapping function and a predetermined scanning pattern of the time varying linear polarization vector.

2 Claims, 8 Drawing Sheets

NON-GPS LOCAL FULL POSITION AND ORIENTATION REFERENCING SYSTEM

CROSS-REFERENCE TO RELATED APPLICATION

This application claims the benefit of earlier U.S. Provisional Application No. 62/668,186, filed on May 7, 2018, the entire contents thereof being incorporated herein by reference.

The present disclosure is related to U.S. Pat. Nos. 8,637,798; 8,514,383; 8,446,577; 8,259,292; 8,164,745; 8,093,539; 8,076,621; 7,193,556 and 6,724,341, the entire contents of each of which are incorporated herein by reference.

BACKGROUND

1. Field

The present invention relates generally to a position orientation referencing system and more particularly to a non-GPS local full position and orientation referencing system.

2. Prior Art

Future smart and guided projectiles, including gun-fired munitions and missiles, require information as to their absolute (relative to the earth) position and orientation or their position and orientation relative to another object such as the target or the weapon platform, etc. Such sensory position and orientation information is essential for navigation, guidance and control in all smart and guided gun-fired munitions, mortars and missiles. In certain cases, the position and orientation information (absolute or relative to the target or the weapon platform) can be provided to munitions by an outside source, for example, by GPS or by a radar reading or an optical signal that is reflected off the target. In other cases, it is either required or is highly desirable to have autonomous sensors on board the moving object, in this case munitions, to directly measure the position and orientation of the object with respect to a fixed object (for example, a ground station) or a moving object (for example, a moving target).

The most commonly used and versatile position and general heading sensory system for munitions guidance and control and by warfighter is based on GPS. Even when other sensors, such as inertial sensors, are used, the GPS signal is required to reset the sensors at regular time intervals. The GPS, however, has several significant shortcomings that makes it an unreliable basis for sensory systems in munitions applications. These include the fact that GPS signals may not be available along the full path of the flight; measurements cannot be made fast enough to make them suitable for flight control purposes in gun fired munitions; and the GPS signals are generally weak and prone to jamming.

SUMMARY

It is therefore desirable to provide an alternative local coordinate referencing system to GPS that could cover the battlefield for reasons, such as, loss of the signal, the signal not being available along the full path of the flight, or possibility of jamming or spoofing. The establishment of such a full position and orientation referencing system is provided, which can enable smart munitions, weapon platforms, vehicles and warfighter to have a common accurate, reliable and secure position as well as orientation referencing system, and since static or dynamic target position and heading is also indicated in the same referencing system, the target intercept error is also minimized.

The polarized RF based position and angular orientation sensors, when embedded in munitions, can measure full angular orientation (pitch, yaw, and roll) of the projectile relative to a fixed ground (base) station, or relative to a moving object such as a UAV used for target designation and serving as one of the polarized RF scanning reference sources of the local position and orientation referencing system nodes, or other similarly functioning target designation platforms or forward observers.

The polarized RF based position and angular orientation sensors using the provided local position and orientation referencing system are expected to provide highly precise and full angular orientation (pitch, yaw, and roll) measurements, and since the measurements are absolute with respect to the reference source, as the projectile approaches its target, the position error due to the angular measurement error in the guidance and control loop is reduced, i.e., the sensor acts essentially as a homing device in munitions being guided towards a fixed or moving target.

The capability of the provided local position and orientation referencing system to provide orientation measurement onboard munitions is particularly useful in gun-fired munitions since they provide the means to significantly reduce the guidance and control actuation requirement by providing a significantly better measure of the required actuation to achieve the desired trajectory correction/modification during the flight.

The provided local position and orientation referencing system can be used by sensors onboard various weapons platforms, munitions, UAVs, and handheld devices to determine their position and orientation relative to the established referencing coordinate system. Varieties of RF based sensors, such as those based on cross-polarization, geometrical cavities, surface antenna arrays, etc., may be used with the position and orientation referencing system.

In addition, the angular orientation sensors are autonomous, i.e., they do not acquire sensory information through communication with a ground or airborne source. The sensors are relatively small and can be readily embedded into the structure of munitions, such as fins or body, without affecting their structural integrity. As a result, such sensors are inherently shock, vibration and can be high-G hardened to withstand setback accelerations of over 100,000 Gs. A considerable volume is thereby saved for use for other gear and/or added lethality. In addition, the sensors become capable of withstanding the harsh firing environment, such as temperatures of around 1200 deg. F and pressures of over 100,000 psi during firing. The sensors also require a minimal amount of onboard power to operate.

The local position and orientation referencing system and the polarized RF sensor cavity for onboard moving objects, such as munitions during the flight, mobile platforms and warfighter handheld devices, are described in detail below. The method of making onboard position and orientation measurements using the established local position and orientation referencing system is also described.

An objective the non-GPS local full position and orientation referencing system is establishing a full position and orientation referencing system for target designation, for use by fixed and mobile weapon platforms and soldier handheld devices, for guidance and control of smart and guided projectiles, and for other applications in which GPS is currently being used. The local coordinate referencing system can be capable of being networked with adjacent local coordinate referencing systems as well as being adaptive to accommodate input from multiple sources, such as those provided on UAVs, UGVs, forward observers, and other land and air platforms. The local coordinate referencing system can provide full orientation as well as full position information onboard a moving or fixed object.

An alternative local coordinate referencing system to GPS is provided that could cover the battlefield for reasons such as loss of the signal, the signal not being available along the full path of the flight, or possibility of jamming or spoofing. The full position and orientation referencing system can enable smart munitions, weapon platforms, vehicles and warfighter to have a common accurate, reliable and secure position as well as orientation referencing system, and since static or dynamic target position and heading is also indicated in the same referencing system, the target intercept error is also minimized.

The provided local coordinate referencing system is robust, relatively small and low power, rugged, and capable of being deployed very quickly and automatically synchronize and network with other referencing sources and provide an operational range of over 30 and preferably 50 km. It is also capable of networking with adjacent systems, including GPS when available, to extend its range as well as its accuracy. The system provides full position, including elevation accuracy, of better than 2 m and sub-degree full orientation accuracy. The local referencing system must be minimally prone to detection, jamming and spoofing.

The non-GPS local full position and orientation referencing system provided herein is based on the fully electronic Scanning Polarized RF Reference Source (SPRS) disclosed in U.S. Pat. Nos. 8,637,798; 8,514,383; 8,446,577; 8,259,292; 8,164,745; 8,093,539; 8,076,621; 7,193,556 and 6,724,341, the entire contents of each of which are incorporated herein by reference. In such referencing system, any fixed or moving object can determine its full position (including elevation) using one of the commonly used and time-of-flight and triangulation or other similar available methods. Full onboard orientation measurement is made using geometrical cavity sensors, which employ the basic Polarized RF Orientation Sensor technology previously developed.

In addition, since the scanning reference sources used in the provided local full position and orientation referencing system are fully electronic and software driven, their scanning pattern can be varied on-the-fly, the transmitted scanning RF signal is polarized, the transmitted reference source signals are relatively low power and are only needed to be transmitted intermittently as random pulses, therefore it is effectively impossible to detect, jam or spoof the provided local full position and orientation referencing system.

Performance characteristics of the provided local full position and orientation referencing system include:

1. The Scanning RF Polarized Reference Sources (SPRS) used to construct the local full position and orientation referencing system are fully electronic and software driven, making it capable of providing almost any intermittent pulsed scanning pattern and rate, in the range of a few Hz to several MHz or more.

2. The operating frequency of the scanning reference sources can be selected to make the system completely compatible with other military systems in the field.

3. The Scanning RF Polarized Reference Sources (SPRS) of the local full position and orientation referencing system may be stationary or mounted on various weapon platforms, including UAVs and UGVs, or be carried by forward observers. They may also be mounted on self-aligning platforms for quick deployment in the field, including even by gun-launch or air drop.

4. Once deployed, the stationary and moving scanning polarized reference sources may be provided with the capability of being automatically synchronized to form the local full position and orientation referencing system over the entire battlefield with multiple (redundant) reference sources to make the system highly reliable, very difficult to jam or spoof, and increase accuracy.

5. The pattern scanning capability of the employed scanning RF polarized reference sources allows the implementation of various well established and novel signal processing techniques to significantly increase sensor precision and reduce the effects of noise, reflections and multi-paths.

6. The scanning capability of the reference sources allows the implementation of nonlinear pattern matching techniques that decouples angular orientation information from the position information in sensor measurements and would therefore increase measurement precision by orders of magnitude due to the inclusion of higher order nonlinearities in the orientation and position estimation algorithms. In addition, by decoupling orientation information from the position information, the resulting orientation measurements become insensitive to the distance to the reference source, thereby allowing orientation measurement without the knowledge of distance from the reference sources.

7. The decoupling of orientation and position measurements in the sensors would make it possible for the orientation measurements to be made in line-of-sight as well as not-in-line-of-sight and beyond the line-of-sight conditions.

8. The provided local full position and orientation referencing system can be programmed to provide random scanning signal pulses with very low power levels to avoid detection or utilize other detection avoidance procedures.

9. The RF and software driven nature of the provided local coordinate referencing system makes it capable of being networked with adjacent local coordinate referencing systems as well as being adaptive to accommodate input from multiple sources, such as those provided on UAVs, UGVs, forward observers, and other land and air platforms. The provided referencing system can also network with GPS when its signal is available to enhance position measurement accuracy.

10. The polarized nature of the SPRS transmitted waves and the high sensitivity of the polarized RF sensors to be used for position and orientation measurement makes the generally random ground reflections to be received as random noise at the sensor and thereby be filtered with the patterned signals. As a result, the multi-path effect should become negligible on the position and orientation sensory system.

11. The provided local full position and orientation referencing system enables smart munitions, weapon platforms, UAVs, UGV and warfighter to have a common accurate, reliable and secure position and orientation referencing system, and since static or dynamic target position and heading is also indicated in the same referencing system, the target intercept error is minimized.

12. The polarized RF cavity sensors that use the signals provided by the local full position and orientation referencing system for full orientation (roll, pitch and yaw) measurement can be small and can be integrated into the external structure of the munitions.

13. The polarized RF based position and angular orientation sensors using the provided local position and orientation referencing system can provide highly precise and full angular orientation (pitch, yaw, and roll) measurements, and since the measurements are absolute with respect to the reference source and the target designation is made in the same referencing coordinate system by a UAV or other forward observer equipped with a scanning referencing source, as the projectile approaches its target, the position error due to the angular measurement error in the guidance and control loop is reduced, i.e., the sensor acts essentially as a homing device in munitions being guided towards a fixed or moving target.

14. The capability of the provided local position and orientation referencing system to provide orientation measurement onboard munitions have particularly utility in gun-fired munitions since they can significantly reduce the guidance and control actuation requirement by providing a significantly better measure of the required actuation to achieve the desired trajectory correction/modification during the flight.

15. The local full position and orientation referencing system can be deployed and operated in all weather conditions, including non-line-of-sight conditions.

16. The provided local position and orientation referencing system can be used by sensors onboard various weapons platforms, munitions, UAVs, and handheld devices to determine their position and orientation relative to the established referencing coordinate system. Varieties of RF based sensors such as those based on cross-polarization, geometrical cavities, surface antenna arrays, etc., may be used with the established position and orientation referencing system.

BRIEF DESCRIPTION OF THE DRAWINGS

These and other features, aspects, and advantages of the apparatus of the present invention will become better understood with regard to the following description, appended claims, and accompanying drawings where:

DETAILED DESCRIPTION

Two of the technologies to be used in the provided full position and orientation referencing system concept, namely the Polarized RF Geometrical Cavity Orientation sensors and Scanning Polarized RF Reference Sources, will be briefly described below.

Polarized RF Geometrical Cavity Orientation Sensors (PGCOS)

Figure 1:
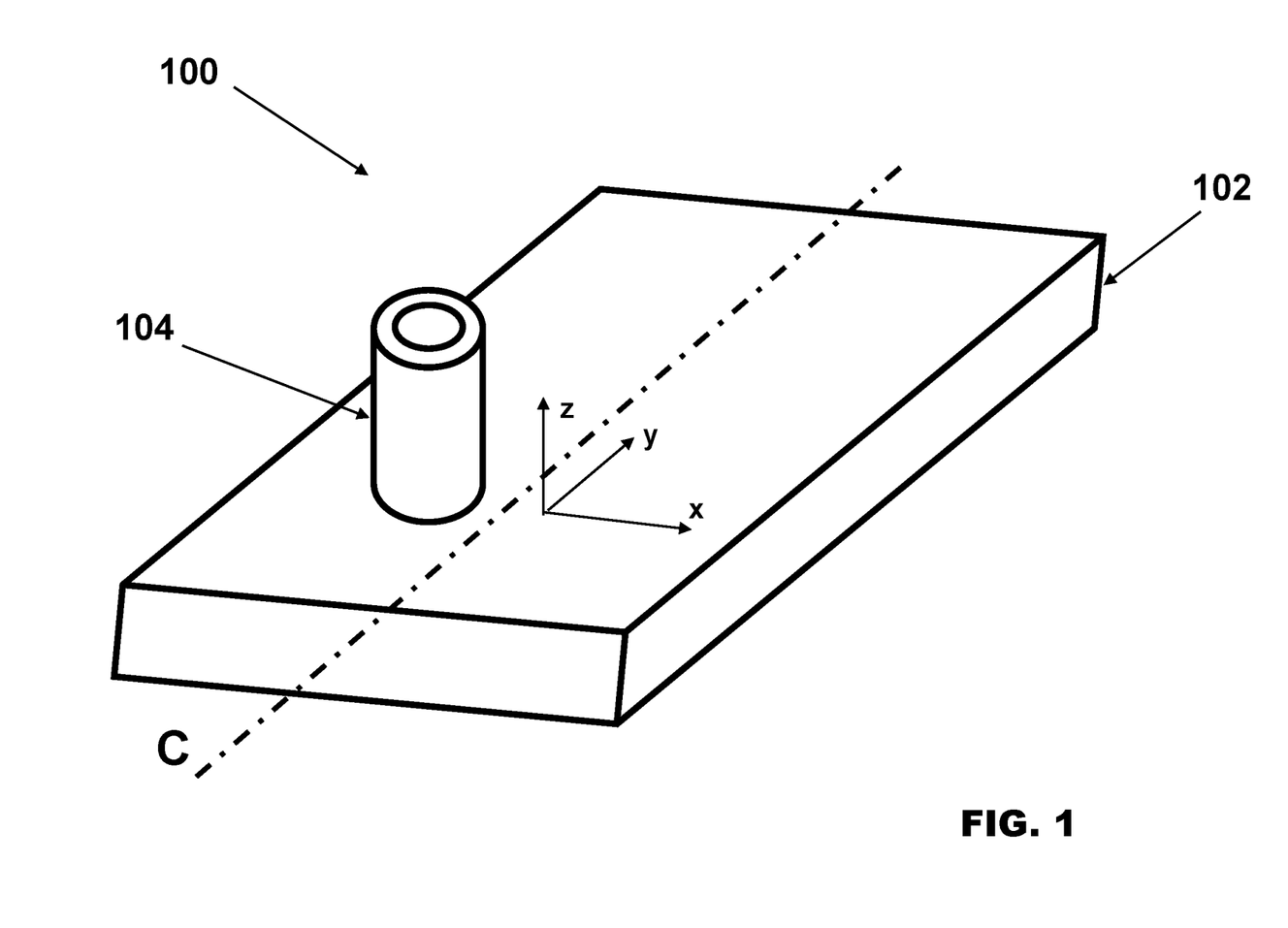
FIG. 1 illustrates a polarized RF geometrical cavity orientation sensor.
Figure 2:
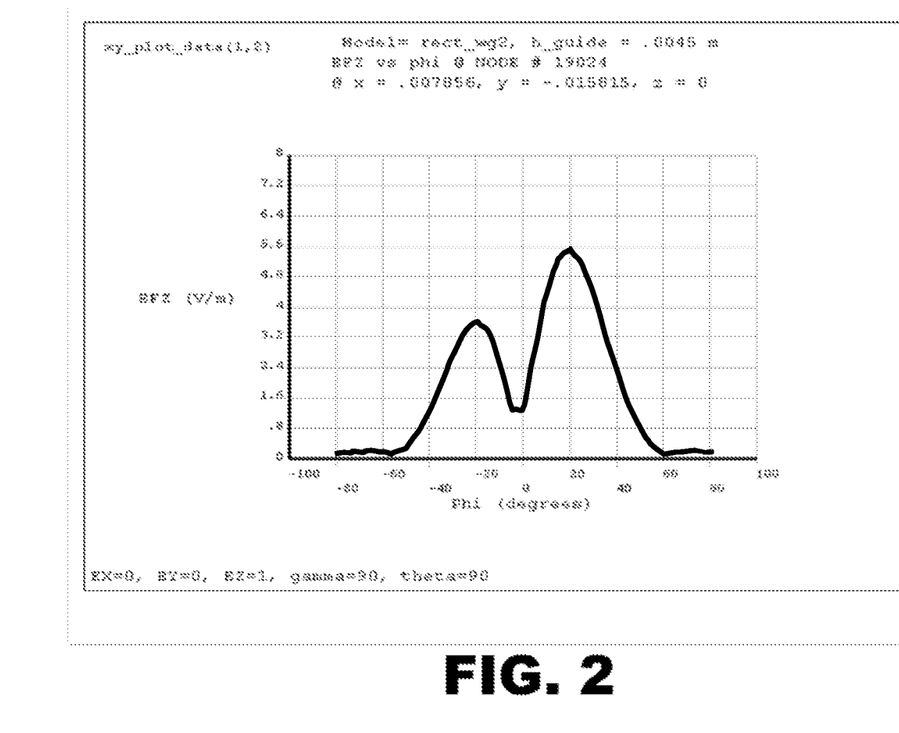
FIG. 2 graphically illustrates a simulated response of the polarized RF geometrical cavity orientation sensor of FIG. 1.
Figure 3:
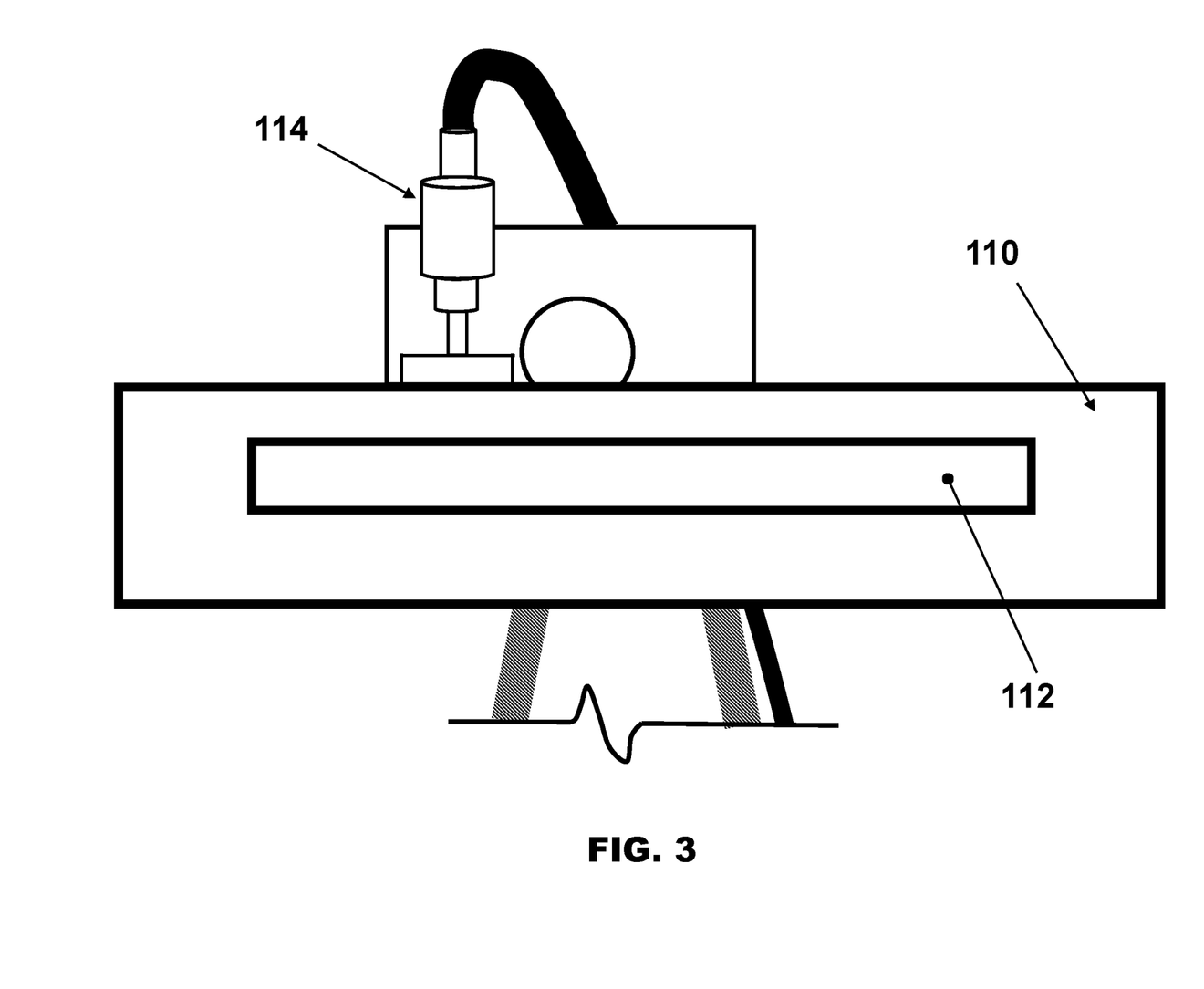
FIG. 3 illustrates a polarized RF geometrical cavity orientation sensor with pick up terminal offset from a center line.
Figure 4:
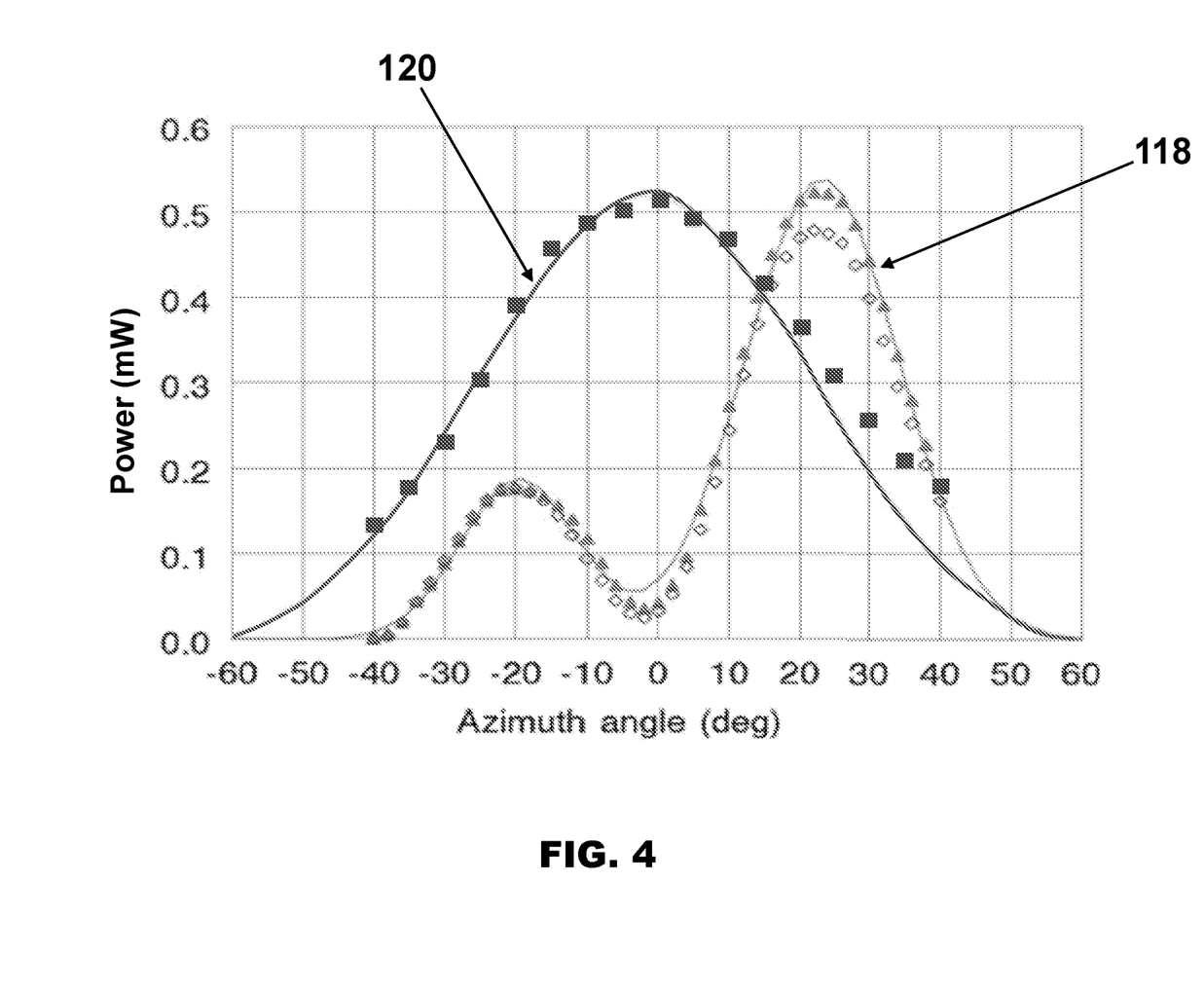
FIG. 4 graphically illustrates a measured voltage response of the polarized RF geometrical cavity orientation sensor, measured at an elevation angle of 7.5 and the response of a 10 dB horn.

The orientation sensors in the present system are geometrical cavities with one or more pick up terminals that are designed to provide output that varies with orientation of the sensor with respect to the direction of the incoming polarized RF plane of polarization. Using ANSYS Finite Element (FE) modeling and Finite Element Analysis (FEA) software for modeling sensor structures and their interaction with RF waves, angular orientation sensitivity of geometrical cavity sensors to incoming polarized RF waves has been extracted. As an example, a PGCOS was found to have an asymmetric response in the azimuth plane, with a +/−10 deg. tolerance to elevation misalignment. FIG. 1 shows a model of an initial PGCOS 100 configuration used for performance optimization, which includes terminal positioning as one of the design parameters, as well as, maximum sensitivity and minimal cross-sensitivity. The optimally obtained sensor design is illustrated in FIG. 1, and has a rectangular cavity 102 defined by a width of 2.25λ, a height of 0.15λ and a length of 0.75λ. The optimal location of the terminal 104 is found to be located to one side of the center line C. The expected azimuth angular response, as measured by the voltage at the output of the terminal, is illustrated in FIG. 2. FIG. 3 shows a fabricated PGCOS 110 showing the cavity opening 112 of the rectangular cavity and terminal 114. Angular response of the PGCOS was measured in an anechoic chamber and the results 118 are plotted in FIG. 4, which also shows a comparison with the angular response 120 of a standard 3-dB pyramidal horn antenna.

Scanning Polarized RF Reference Source (SPRS)

The fully electronic Scanning Polarized RF Reference Source (SPRS), which comprises two vertically polarized RF waves, is based on paradigm shifting concepts. The approach combines the amplitude modulation of the two polarized waves to produce a time varying power fluctuation (pattern) in the PGCOS. Nonlinear signal processing techniques are then used to determine angular position of the PGCOS in the coordinate system of the SPRS with very high precision. Mapping of the angular information into a power fluctuating pattern makes the measuring system very robust. Indeed, known non-linear signal processing techniques can be used to recover the angle, even when the signal-to-noise ratio of the measured RF signal is below unity. In other words, a signal pattern can be hidden in the environmental noise, making the system immune to all countermeasures. High angular precision is possible due to the complex modulation patterns, and mapping of the angular space to the time domain. With off-the shelf components, time measurement accuracy has been shown to be better than 0.1%. Thus, angle accuracy, which is proportional to time, can potentially become better than 0.06° for a scan range of +/−30°.

The RF scanning reference source transmits vertically polarized waves. As a result, ground reflections become negligible. This adds increased sensitivity to the sensors of the emplaced munitions.

Figure 5:
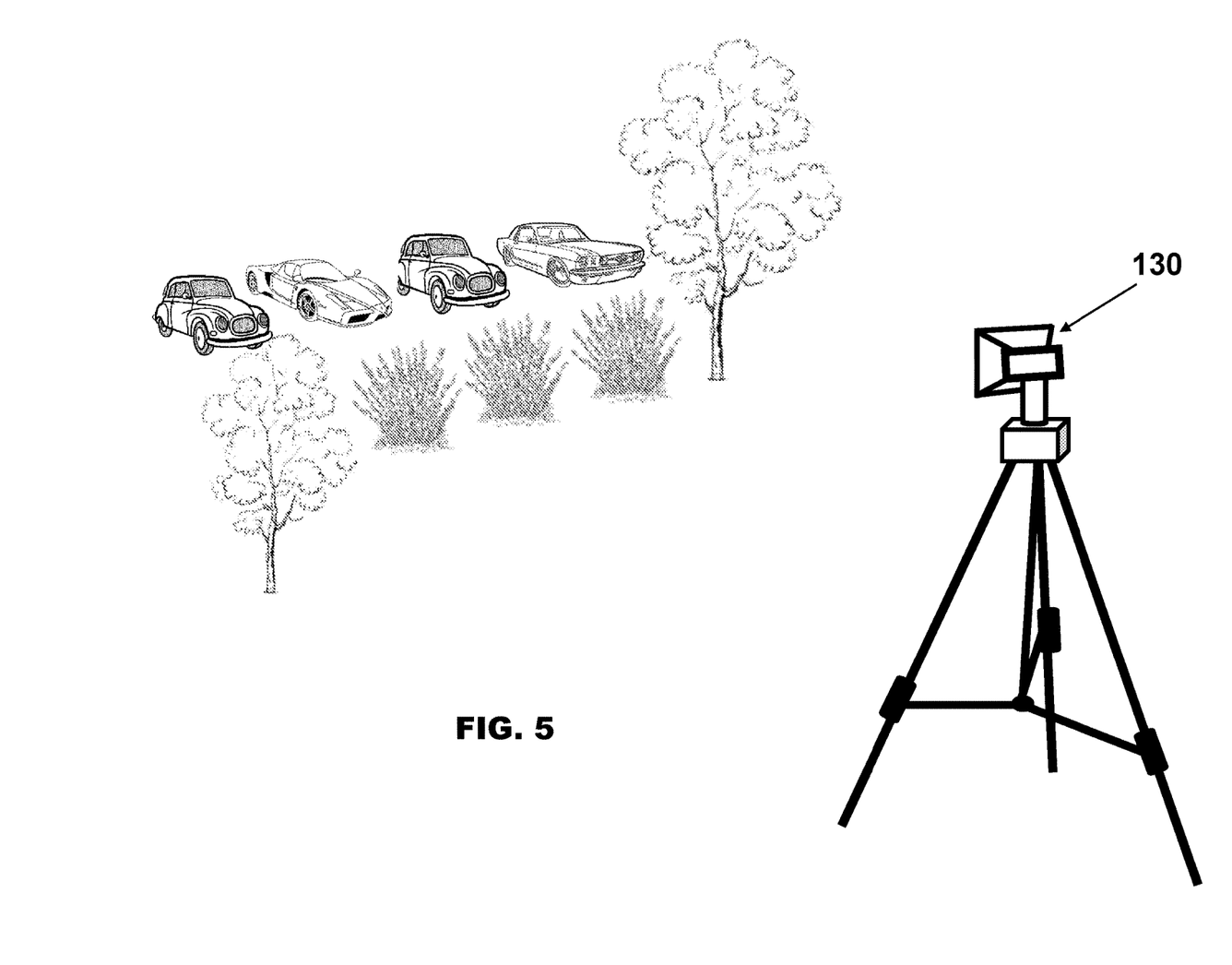
FIG. 5 illustrates a polarized RF scanning source.

Such Polarized RF scanning source is known for measurement of roll angle of objects. In this case, two orthogonal polarization states are used and amplitude modulated to define a time varying linear polarization vector. This reference source illuminates the PGCOS discussed above. FIG. 5 shows a NLOS environment in which the field measurements were made. In the foreground the source is visible, but the PGCOS is hidden behind the tree line in the background.

Figure 6:
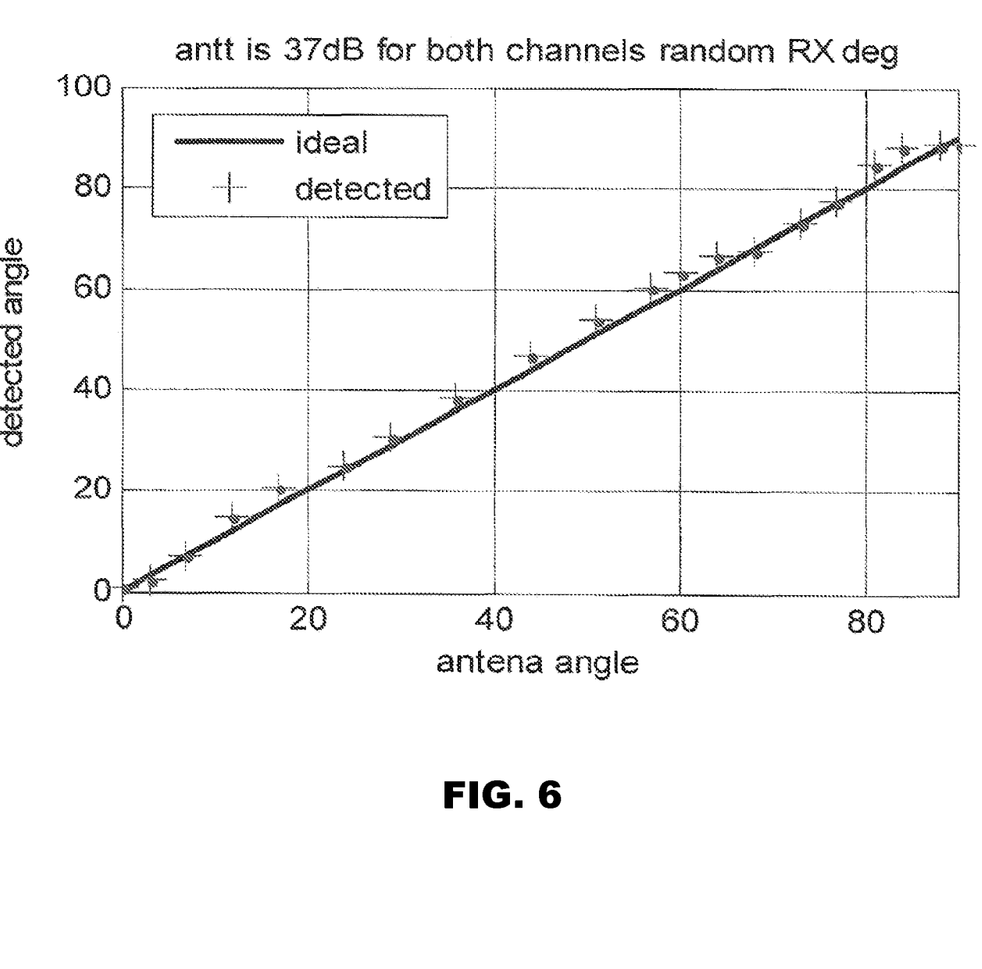
FIG. 6 graphically illustrates a roll angle response.

A dual polarization, 18 dB, horn 130 is used to transmit the two amplitudes modulated linearly polarized RF waves, for example at 10 GHz. Measurements are done at various roll positions and the angle of the sensor relative to the SPRS is extracted through non-linear signal processing of the measured scan response. FIG. 6 summarizes data obtained over a roll angle range from 10 degrees to 80 degrees.

Omnitek Polarized RF Geometrical Cavity Sensors with Scanning Polarized RF Reference Sources for Precision Angular Position Measurement Polarized RF Geometrical Cavity Orientation sensors (PGCOS) together with a single Scanning Polarized RF Reference Source provide the means of measuring angular orientation of fixed or moving objects located tens or even hundreds of kilometers from the referencing source with very high precision. These geometrical cavity sensors are positioned on the object and can be designed to be very sensitive to a desired orientation. Together the PGCOS and the SPRS measure the orientation of the object in the coordinate system of the SPRS. The distance from the referencing source to the object, i.e., the object range, is also measured using well known time of flight techniques. The location of all objects can then be calculated in the coordinate system of the referencing source.

Non-GPS Local Full Position and Orientation Coordinate Reference System

The novel non-GPS local full position and orientation referencing coordinate system is based on the aforementioned fully electronic Scanning Polarized RF Reference Source (SPRS) and Polarized RF Geometrical Cavity Orientation sensors (PGCOS). Together the PGCOS and the SPRS measure the orientation of the object in the coordinate system of the SPRS. The full position of the object in the established referencing coordinate system is measured using well known time of flight and triangulation techniques.

The local full position and orientation coordinate referencing system is robust, relatively small and low power, rugged, and capable of being deployed very quickly and automatically synchronize and network with other fixed or moving referencing sources and should be able to provide an operational range of over 30 and preferably 50 km. The referencing system can network with all available adjacent systems, including GPS when available, to extend its range as well as its accuracy. Even though a minimum of three Scanning Polarized RF Reference Source (SPRS) are needed to established the full position and orientation coordinate referencing system, a significant number of additional SPRS sources, particularly those provided on UAVs that are used for target designation or mobile platforms engaging targets, can be used for the sake of redundancy to ensure reference source availability as well as to increase position and orientation measurement accuracy over the covered area and achieve better than 2 m position and sub-degree full orientation accuracy.

The polarized RF based position and angular orientation sensors, when embedded in munitions, can measure full angular orientation (pitch, yaw, and roll) of the projectile relative to a fixed ground (base) station, or relative to a moving object such as a UAV used for target designation and serving as one of the polarized RF scanning reference sources of the local position and orientation referencing system nodes, or other similarly functioning target designation platforms or forward observers.

The polarized RF based position and angular orientation sensors using the local position and orientation referencing system provide highly precise and full angular orientation (pitch, yaw, and roll) measurements, and since the measurements are absolute with respect to the reference source, as the projectile approaches its target, the position error due to the angular measurement error in the guidance and control loop is reduced, i.e., the sensor acts essentially as a homing device in munitions being guided towards a fixed or moving target.

In addition, since scanning polarized RF reference sources are fully electronic and software driven, their scanning pattern can be varied on-the-fly, the transmitted scanning RF signal is polarized, the transmitted reference source signals are relatively low power and are only needed to be transmitted intermittently as random pulses, therefore it is effectively impossible to detect, jam or spoof the proposed local full position and orientation referencing system.

Orientation Measurement Using Scanning Patterns

Figure 7:
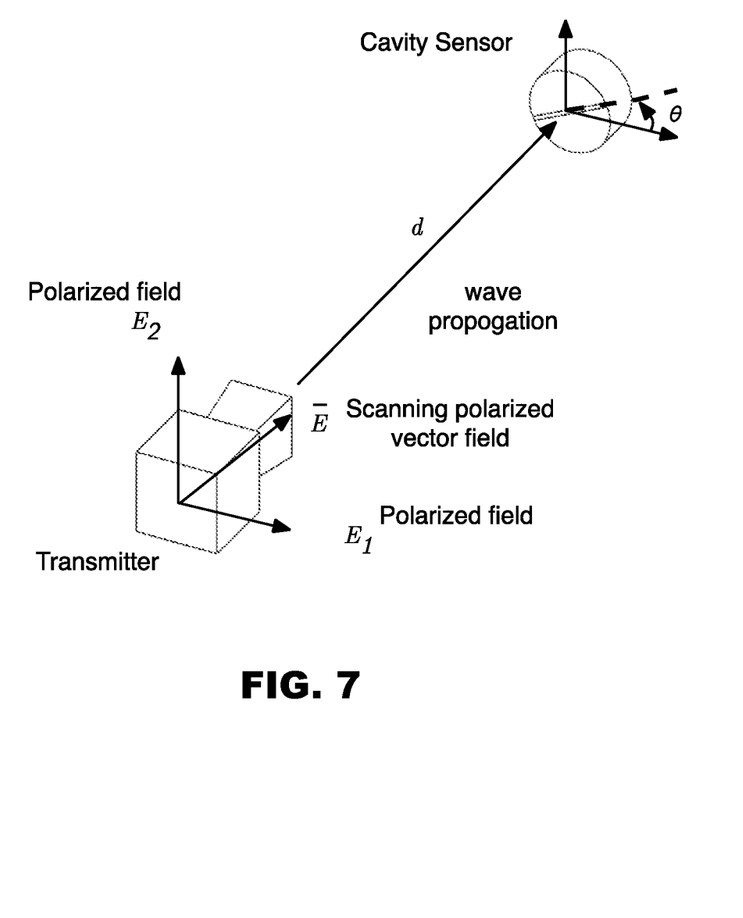
FIG. 7 illustrates a polarized RF angular orientation sensory system.
Figure 8:
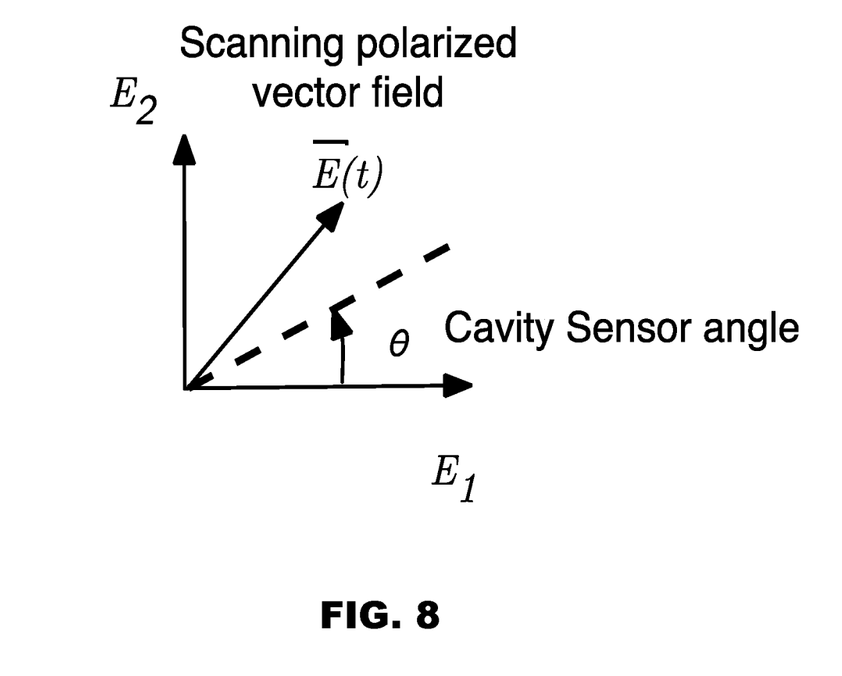
FIG. 8 a polarized scanning vector sensor cavity angle.

The sensory system comprises a scanning polarized field transmitter (referencing source) and the receiving cavity sensors as shown in FIG. 7. Referring to FIG. 8, by modulating the amplitudes of the synchronized and polarized field $E_1$ and $E_2$, the referencing source transmits a scanning polarized vector field $\bar{E}(t)$. By properly modulating the two field amplitudes, the desired vector field scanning pattern is obtained. It is noted that $E_1$ and $E_2$ do not have to be orthogonal. The angle to be measured by the sensor is $\theta$, which is the roll angle relative to the direction of wave propagation.

The field strength detected by the sensor at an angle $\theta$ is given by the scalar function R(t) as $$R(t) = g(d) f(\bar{E}(t), \theta) \tag{1}$$

where g(d) is a gain related to the distance d from the source to the sensor and the environmental factors. Since the time taken to make an angle measurement is very small, changes in the gain g(d) during this time period is negligible and the gain can be considered to be constant.

The mapping function $f(\bar{E}, \theta)$ is determined by the configuration of the cavity sensor and its calibration. Since the angle $\theta$ is measured by matching the scanning pattern as described below, the effect of the fixed gain g(d) is eliminated during each angle measurement.

The method finds the angle $\theta$ from measured amplitude of the vector R(t), known mapping function $f(\bar{E}, \theta)$ and the scanning pattern of the vector $\bar{E}(t)$.

Sample Scanning Pattern

Consider a scanning vector field $\bar{E}(t) = E_x(t)\hat{i} + E_y(t)\hat{j}$ formed by the transmission of two perpendicular synchronized electric field signals $E_x(t)$ and $E_y(t)$, which are modulated as follows $$E_x(t) = a(\cos \omega t + \cos 2\omega t) + b \tag{2}$$

$$E_y(t) = a(\sin \omega t + \sin 3\omega t) + b \tag{3}$$

where $\omega$ is the fundamental frequency, a is a constant signal amplitude and b is the constant that provides proper amplitude modulation index. Then the electric field detected by the polarized cavity sensor becomes $$R(t) = g(d)(E_x(t)\cos\theta + E_y(t)\sin\theta) = \tag{4}$$
$$g(d)\{[a(\cos\omega t + \cos 2\omega t) + b]\cos\theta + [a(\sin\omega t + \sin 3\omega t) + b]\sin\theta\} =$$
$$g(d)[a(\cos\omega t\cos\theta + \sin\omega t\sin\theta) +$$
$$a\cos\theta\cos 2\omega t + a\sin\theta\sin 3\omega t + b(\sin\theta + \cos\theta)] =$$
$$g(d)[a\cos(\omega t - \theta) + a\cos\theta\cos 2\omega t + a\sin\theta\sin 3\omega + b(\sin\theta + \cos\theta)]$$

The angle $\theta$ can be determined from the phase shifting of the fundamental frequency $\omega$ and zero crossing of the fundamental frequency, which is given by the relative phase of the harmonics $2\omega$ and $3\omega$. For this case, the zero crossing occurs when the harmonics $2\omega$ and $3\omega$ are in phase. As expected, the gain g(d) does not affect the angle measurement.

It will also be appreciated by those skilled in the art that other information is also available in the transmitted signal pattern and the received signal that can be used to increase the precision and robustness of the angle measurement. For example, the amplitude of the fundamental frequency can provide distance information or that the ratio of the amplitudes of the second and third harmonics corresponds to the $\tan(\theta)$, i.e., a redundant measurement for the angle $\theta$. In addition, by including more harmonics in the pattern (1) and (2), more amplitude ratios are provided, therefore providing more angle measurement redundancy, thereby higher angle measurement accuracy.

One important feature of patterns of the type presented in this example is that they provide a reference position angle, which is fixed in the referencing coordinate system of the scanning referencing source. In this case, that the time zero occurs when the two harmonics $2\omega$ and $3\omega$ are in phase.

For a cavity sensor that is designed with certain sensitivity to the angle but linear to the amplitude of $\overline{E}$, the mapping function $f(\overline{E}, \theta)$ can be expressed as $$f(\overline{E},\theta)=|\overline{E}|f'(\theta-\angle\overline{E}) \quad (5)$$

Then the electric field detected by this cavity becomes $$R(t) = g(d)\left[E_x(t)f'(\theta) + E_y(t)f'\left(\theta - \frac{\pi}{2}\right)\right] \quad (6)$$

$$= g(d)\{[a(\cos\omega t + \cos 2\omega t) + b]f'(\theta) + [a(\sin\omega t + \sin 3\omega t) + b]f'\left(\theta - \frac{\pi}{2}\right)\}$$

$$= g(d)\left[a\left(\cos\omega tf'\left(\theta - \frac{\pi}{2}\right) + \sin\omega tf'(\theta)\right) + af'\left(\theta - \frac{\pi}{2}\right)\cos 2\omega t + af'(\theta)\sin 3\omega t + b\left(f'(\theta) + f'\left(\theta - \frac{\pi}{2}\right)\right)\right]$$

$$= g(d)\left[a\sqrt{f'\left(\theta - \frac{\pi}{2}\right)^2 + f'(\theta)^2}\cos(\omega t - \phi) + af'\left(\theta - \frac{\pi}{2}\right)\cos 2\omega t + af'(\theta)\sin 3\omega t + b\left(f'(\theta) + f'\left(\theta - \frac{\pi}{2}\right)\right)\right]$$

where $$\phi = \tan^{-1}\frac{f'(\theta)}{f'\left(\theta - \frac{\pi}{2}\right)}.$$

The angle $\theta$ can then be similarly determined from the phase shift $\phi$. Similar amplitude relationships define the amplitudes of the frequencies $2\omega$ and $3\omega$, and the aforementioned time zero occurs when the two harmonics $2\omega$ and $3\omega$ are in phase.

Network of Multiple Transmitters

As outlined above, in the case of the single Scanning Polarized RF Reference Source (SPRS) and a rotational receiver, the highest sensitivity in the rotational angle estimation can be achieved for the rotation along the axis that is close to the direction of the electromagnetic wave propagation and the sensor cavity terminal is positioned for maximum sensitivity to such rotational angles. To establish the non-GPS local full position and orientation referencing system, at least three SPRS sources with spatially independent directions of wave travel are needed to make full angular orientation and full position measurement onboard objects with appropriately designed Polarized RF Geometrical Cavity Orientation sensors (PGCOS).

It is noted that the main requirement for the proper operation of the proposed local full position and orientation referencing system is that at every position in the field to be covered, at least three SPRS source signals become available. Therefore, when larger fields are to be covered, more SPRS source redundancy may be required. This is particularly the case since high carrier frequencies are expected to be used in SPRS source, and therefore the covered area with each SPRS source will be limited.

The deployment of more than three SPRS source provides redundant measurements for both angular orientation and position. The obtained estimates of the angles can be simply fused to increase the sensitivity of all three angle and position measurements, with a higher weight given to the estimates with the higher sensitivity. The overall sensitivity would be increased with larger spatial diversity of the SPRS source, such as the presence of ground as well as aerial (UAV) based SPRS sources.

Synchronization and Communication

To obtain rotational angle estimates onboard munitions or any other airborne or ground object or platform, the different Scanning Polarized RF Reference Source (SPRS) must be synchronized with each other and with the PGCOS sensor. As part of the proposed efforts, different methods to address the SPRD source synchronization can be used.

One option is time-multiplexing of the transmitted Scanning Polarized RF Reference Source (SPRS) signals. In this scenario, in addition to the modulated signal (scanning pattern), the SPRS sources will incorporate the preamble with the synchronization request, along with the location data to all PGCOS sensors. Simple on-off keying, predefined signal patterns, or more complex coding and modulation techniques can be used to improve reliability and robustness of the link and to prevent jamming and spoofing.

In another option, the same antenna of the polarized RF reference sources, SPRSs, can also be used to receive signals from other SPRSs by multiplexing the antenna connection between the power amplifier for the data transmission and the receiving circuitry for receiving data. These communication links between the SPRSs can provide synchronization with the data fusion and processing and provide the required information to the SPRSs for their automatic synchronization. This option greatly reduces the computation load at the sensor.

In yet another option and when appropriate, for example for UAVs and UGVs or larger ground platforms, the same antenna of the polarized RF reference sources, SPRSs, is also used to receive signals from other SPRSs by multiplexing the antenna connection between the power amplifier for the data transmission and the receiving circuitry for receiving data. In addition, similarly, the receiving PGCOS sensor antenna along the propagation path to the specific SPRS transmitter can be used to transmit data from the sensor to that SPRS. These communication links between the PGCOS sensors and each of the SPRS transmitter can provide synchronization with the data fusion and processing at the sensor, as the sensor would provide the central clock for the synchronization. To reduce computational load at the sensor, the data can be transmitted to one of the SPRSs for further processing.

Instead of having a sensor-centric system, the synchronization, at least for munitions applications, can be performed through the SPRSs, since they can also communicate to each other without the sensor in the loop. This greatly reduces the computation load at the sensor.

Commercialization Applications

Although the above systems and methods have particular utility for munitions, the RF scanner sensors disclosed above also have widespread commercial use and can be utilized in any application where a gyro is used. One example is for controlling mobile robots. Mobile robots are expected to be utilized extensively in the near future for a variety of applications, such as those involving repetitive tasks that are not easily done by humans or those involving conditions that are not safe for humans. Another example is for collision avoidance where is it necessary to accurately know the direction of travel of surrounding cars relative to the position of your car. Such information is used in a feedback loop to control your car (or the surrounding cars) to avoid a collision. In addition, very accurate orientation measuring sensors can be made using the above described novel RF scanning reference source and sensor system.

The RF sensors disclosed above have widespread commercial use in finding and communicating with unattended articles. That is, any article which is placed in a certain location and left unattended over a period of time can be later found/communicated with using the RF sensor technology disclosed herein. Some examples of unattended articles may be survey markers construction equipment, buoys and the like.

The RF sensors disclosed above also have widespread commercial use in tracking mobile articles. That is, any article, including live animals/people which move with time can be tracked using the RF sensor technology described herein. Some examples of unattended articles include: tracking and controlling driverless cars, collision avoidance systems for cars (whether or not they are driverless), locating toddlers/pets and the like.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for setting up a reference coordinate system to determine a position and orientation of an object relative to the reference coordinate system, the method comprising:

providing an object with one or more sensors, the one or more sensors each having a geometrical cavity with one or more pick up terminals configured to provide an output that varies with orientation of the one or more sensors with respect to a direction of an incoming polarized RF plane of polarization;

using three or more polarized RF reference sources each having two polarization planes offset from each other and each different from polarization fields of other polarized RF references sources;

amplitude modulating the two polarization planes for each of the three or more polarized RF reference sources to define a time varying linear polarization vector for each of the three or more polarized RF reference sources; and determining, for each of the three or more polarized RF reference sources, the position and orientation of the object relative to the reference coordinate system based on a measured amplitude of the time varying linear polarization vector at the one or more sensors, a predetermined mapping function and a predetermined scanning pattern of the time varying linear polarization vector.

2. The method of claim 1, further comprising synchronizing the three or more polarized RF reference sources to each other and to the one or more sensors.

* * * * *